United States Patent
Pedersen

(10) Patent No.: US 7,770,717 B2
(45) Date of Patent: Aug. 10, 2010

(54) DEVICE FOR TRANSFER OF ITEMS

(75) Inventor: Bjorn Heide Pedersen, Randers (DK)

(73) Assignee: Scanvaegt International A/S, Arhus N (DK)

( * ) Notice: Subject to any disclaimer, the term of this patent is extended or adjusted under 35 U.S.C. 154(b) by 0 days.

(21) Appl. No.: 12/090,021

(22) PCT Filed: Oct. 12, 2006

(86) PCT No.: PCT/DK2006/000573

§ 371 (c)(1),
(2), (4) Date: May 7, 2008

(87) PCT Pub. No.: WO2007/042041

PCT Pub. Date: Apr. 19, 2007

(65) Prior Publication Data

US 2008/0223695 A1    Sep. 18, 2008

(30) Foreign Application Priority Data

Oct. 12, 2005  (DK)  ................................ 2005 01427

(51) Int. Cl.
 *B65G 15/42* (2006.01)
(52) U.S. Cl. .................. 198/689.1; 198/443
(58) Field of Classification Search ............ 198/396, 198/443, 689.1, 861.2, 861.3
See application file for complete search history.

(56) References Cited

U.S. PATENT DOCUMENTS

| 3,237,753 | A | * | 3/1966 | Allen et al. ............ 198/689.1 |
| 3,545,631 | A | | 12/1970 | Mojden et al. |
| 3,592,334 | A | | 7/1971 | Fleischauer |
| 3,722,665 | A | | 3/1973 | Probasco |
| 3,764,024 | A | * | 10/1973 | Mojden ................. 198/689.1 |
| 4,406,359 | A | * | 9/1983 | Cole et al. ............. 198/689.1 |
| 4,670,935 | A | * | 6/1987 | Bowler ................. 198/689.1 |
| 5,295,574 | A | * | 3/1994 | Overstreet et al. ...... 198/689.1 |
| 5,819,907 | A | * | 10/1998 | Simkowski ............ 198/689.1 |
| 6,048,163 | A | * | 4/2000 | Atkinson .............. 198/689.1 |
| 2005/0072654 | A1 | | 4/2005 | Fraval et al. |

FOREIGN PATENT DOCUMENTS

DE    3626244 A1    2/1988
DE    19614742 A1    11/1997

(Continued)

OTHER PUBLICATIONS

International Search Report dated Dec. 8, 2006.

*Primary Examiner*—James R Bidwell
(74) *Attorney, Agent, or Firm*—Pearne & Gordon LLP

(57) ABSTRACT

A device for transfer of items, in particular food items such as pieces of meat, with the device having a base part using a vacuum source, a conveyor belt having a plurality of openings formed in the conveyor belt, a driver for the conveyor belt and a support adapted for supporting the conveyor belt. The conveyor belt is arranged in a path or course such that the conveyor belt is supported by the support. Further, the base part has a first part corresponding to a vacuum transport zone and a second part corresponding to a friction transport zone. The invention also relates to a method of transferring items, in particular food items such as pieces of meat.

40 Claims, 8 Drawing Sheets

FOREIGN PATENT DOCUMENTS

Figure 1:
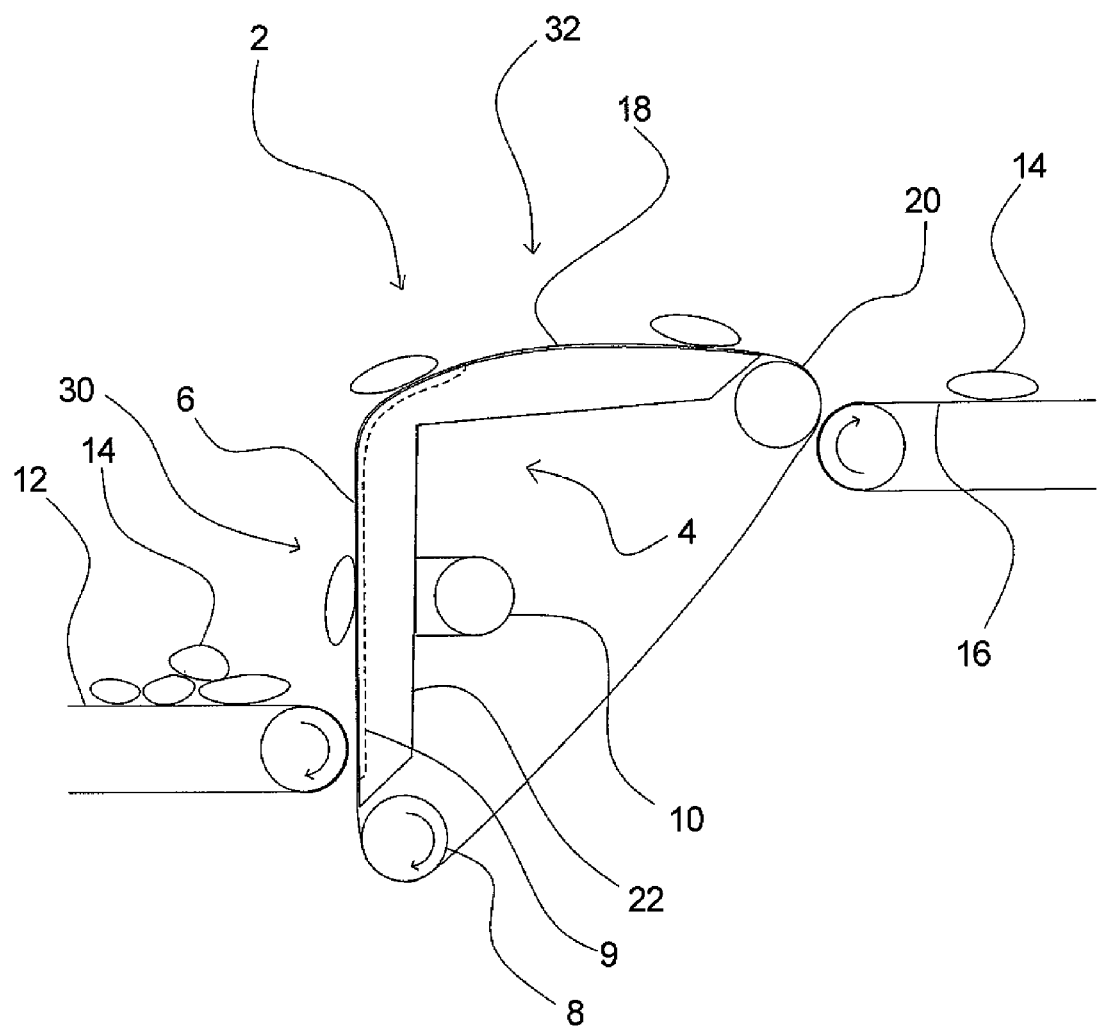

| | | |
|---|---|---|
| EP | 0000378 A1 | 1/1979 |
| EP | 0276949 A | 8/1988 |
| EP | 0619249 A1 | 10/1994 |
| EP | 0827918 A2 | 3/1998 |
| EP | 1021361 B1 | 3/2003 |
| GB | 1042399 | 9/1966 |
| GB | 2128953 A | 5/1984 |
| JP | 2070616 | 3/1990 |
| NL | 9102028 | 12/1991 |
| WO | 2005035405 A1 | 4/2005 |

\* cited by examiner

DEVICE FOR TRANSFER OF ITEMS

FIELD OF THE INVENTION

The invention relates to a device for transfer of items, in particular food items such as pieces of meat etc., which device comprises a base part having vacuum communication means, a conveyor belt having a plurality of openings formed in the conveyor belt, and drive means for said conveyor belt.

The invention also relates to a method of transferring items, in particular food items such as pieces of meat.

BACKGROUND OF THE INVENTION

In connection with transport, weighing, processing, handling etc. of a wide variety of items, including food products such as pieces of meat, e.g. pieces of meat from fish, poultry, cattle etc. or other food products, it is desired to be able to pick-up or grip such items and move or transfer such items one by one. This is in particular the case when such items are feed in an unorderly form, possibly with a plurality of items piled up, in which case it will be difficult to grip the individual items. Furthermore, it is desirable to be able to pick-up or grip such items and move or transfer such items one by one when it is of importance that the items are delivered and transported further on with a predefined minimum mutual distance, for example required in view of a subsequent processing or handling of the items.

It is known to use various vacuum transport devices in such connections.

Such devices have been disclosed for example in EP 619249 A1, EP 1021361 B, NL 9102028 and WO 2005/035405 A1.

In EP 619249 A1 and EP 1021361 B devices are disclosed which use gripping elements which are placed in a circular configuration in such a manner that the gripping elements are moved in an essentially horizontal plane. The suction effect is achieved by means of a vacuum source, which may be connected to the individual gripping elements in a controllable manner. The gripping elements are controlled to pick-up individual items at a first position and deliver the items at a second position along the circular path.

In NL 9102028 a device for picking up fish is disclosed, which device comprises a wheel placed with its axis of rotation horizontally and with a plurality of suction cups placed at the perimeter of the wheel and facing radially outwards. The wheel has to be moved at least partially through the container, from which the fish are picked.

WO 2005/035405 A1 discloses a rotating cylinder which is placed with its axis of rotation horizontally and which has a number of suction openings at its cylindrical surface. Vacuum from a vacuum source is connected to the suction openings via tubes in the cylinder body and a manifold arrangement placed at one end of the rotating cylinder.

The above-mentioned prior art devices are provided with various mechanical devices in order to control the suction effect, e.g. in order to achieve that the vacuum is disconnected at the location, where it is desired to deliver the items. Such mechanical devices may add to the complexity of the device and may hinder an effective cleaning of the device. Furthermore, it is noted that these devices all have a static configuration in as the transport path is restricted by the circular arrangements and in as the locations, where the items can be picked-up and delivered, are given by the configuration of the structures, meaning that these prior art devices lack flexibility in this regard.

Furthermore, it is known to use a conveyor belt having suction openings for transporting items, where vacuum is connected to the suction openings. Such vacuum conveyor belt arrangements for transporting items are also disclosed in the prior art in various forms, as it will be explained in the following.

In U.S. 2005/0072654 A1, for example, a conveyor assembly for separating and transporting articles is described, which assembly comprises a vacuum conveyor in the form of a non-rotating vacuum drum and an endless belt which moves about the periphery of the drum. The belt is provided with an arrangement of openings along the length of the belt at preselected positions in order to allow for vacuum engagement of the articles. The belt is driven about the vacuum drum in such a manner that the belt is in contact with the drum for approximately half the periphery of the drum and articles which are engaged by an opening of the belt in this area can be transported by the belt along the periphery of the drum. The manner in which vacuum is led to the openings in the belt is not described, however, but it is indicated that at the location where the belt leaves the periphery of the drum, the suction effect of the openings is disrupted and the articles are released. The articles may be engaged at the top of the drum and transported down to the bottom of the drum or vice versa. In both cases articles, which are not engaged by a suction hole or which are not properly engaged, will fall down into a chute and will be fed back to a feed conveyor. Also, in both cases it is necessary to have a feeding conveyor as well as a pick-up conveyor for handling the articles, that are transported by the device.

EP 0 827 918 A2 discloses a conveyor belt comprising an endless belt being driven in a path having an upper and a lower run, which are horizontal. The belt comprises vacuum recesses which are connected to vacuum channels emerging on the rear of the belt. Above the lower run of the belt a number of vacuum boxes are placed end to end, which vacuum boxes are connected to a vacuum source. Thus, items fed to the lower side of the conveyor at one end can be transported to the other end hanging below the conveyor belt, i.e. a distance corresponding at most to the total length of the vacuum boxes and only in a horizontal direction.

In JP 2070616 A vacuum conveyor belts are applied for removing lids from boxes, where two vacuum conveyor belts are arranged essentially in parallel, but displaced in the longitudinal direction. The boxes are transported by means of a first vacuum conveyor towards a second vacuum conveyor, and when a box has reached a location between these two conveyors, the first vacuum conveyor belt is lifted upwards, whereby the lid of the box engages the lower run of the second vacuum conveyor belt and is gripped by a suction hole in the lower run of the second vacuum conveyor belt. Further, the main body of the box is withheld to the first vacuum conveyor belt by means of the action of a vacuum box placed under the first conveyor belt. As the two conveyors move away from each other, the lid is removed from the box and carried further by the second vacuum conveyor belt. The vacuum arrangement of the second vacuum conveyor belt comprises an elongated vacuum box placed above the lower run of the belt, whereby two rows of holes in the belt may be subjected to vacuum when passing the vacuum box.

Further, U.S. Pat. No. 3,722,665 A describes a vacuum elevating conveyor, where articles are elevated using a conveyor with an endless belt that is arranged with a steep inclination and with an elongated vacuum box beneath the upper run of the belt. The belt comprises vacuum holes, whereby articles may be engaged at the lower end of the conveyor belt, withheld due to the suction and carried upwards on the belt for further transport, when released from the belt at the end of the vacuum box.

As it will be understood, also these prior art devices all have static configurations in as the transport path is restricted and in as the locations, where the items can be picked-up and delivered, are given by the configuration, meaning that these prior art devices also lack flexibility in this regard.

Thus, it is an object of the invention to provide an improved vacuum transfer device.

In particular, it is an object of the invention to provide such a transfer device, which provides an improved flexibility, for example as regards applications, feeding and/or outlet options, etc.

Furthermore, it is an object of the invention to provide such a transfer device, which facilitates an effective and relatively easy cleaning of the device.

Still further, it is an object of the invention to provide such a transfer device, by means of which items that are not gripped or that are released during the transfer, do not require special facilities or operations for being offered for transfer again.

These and other objects are achieved by the invention as it will be explained in detail in the following.

SUMMARY OF THE INVENTION

The invention relates to a device for transfer of items, in particular food items such as pieces of meat etc., which device comprises a base part having vacuum communication means, a conveyor belt having a plurality of openings formed in the conveyor belt, drive means for said conveyor belt and support means adapted for supporting said conveyor belt. In accordance with the present invention, said conveyor belt is arranged in a course or path wherein the conveyor belt is supported by said support means and wherein said base part comprises a first part corresponding to a vacuum transport zone and a second part corresponding to a friction transport zone.

It is noted that by the terms "vacuum transport zone" is meant a transport zone, where items are transported primarily due to a suction effect provided by the openings in the conveyor belt, and by the terms "friction transport zone" is meant a transport zone, where items are transported primarily due to the friction characteristics of the conveyor belt in relation to the items. This does not preclude, though, that at the vacuum transport zone friction may have an effect and vice versa for the friction transport zone.

By the invention it is achieved that the items can be gripped and transferred in such a manner that they will be placed with at least a predetermined distance in relation to each other, and further it is achieved that the items are readily provided for further handling, weighing, processing etc., since the friction transport zone will deliver the items directly at a desired location, meaning that it is not necessary to have special conveyor means for picking the items from the vacuum transport zone. Thus, the flexibility of the conveyor belt is taken advantage of not only for performing a vacuum transport, but also for providing a transport in e.g. a horizontal direction. Thus, it will be seen that a hitherto unseen flexibility is achieved as regards the design of such a transfer device. Furthermore, it is achieved that the vacuum transport zone can be arranged with a higher degree of freedom as compared to the prior art devices and that the vacuum transport zone may for example be arranged with a relatively steep inclination and in such a manner that the inlet end of this zone is located directly at or above e.g. a feeding conveyor or another type of feeding means, whereby it is achieved that items that are not gripped or that falls down after having been transported e.g. a small distance, will fall down on or into the feeding means and may readily be gripped by the vacuum transport zone again. Thus, the need to have special arrangements, recirculation conveyors etc., are avoided by the invention.

Further, it is achieved by the invention that an easy and uncomplicated removal of the vacuum belt is facilitated, e.g. due to the structure comprising the base part and e.g. rollers for driving the belt, which further gives the advantage that the belt, the device and other components may easily and effectively be cleaned, which is of importance when e.g. foodstuff items are concerned. Furthermore, the belt may easily be exchanged, for example when it is desired to use a belt having another size and/or type of openings, another spacing between openings, other friction characteristics etc., thereby further adding to the flexibility of the device.

Advantageously, as specified in claim 2, said vacuum transport zone may be arranged for extending essentially vertically.

Hereby, a number of advantages are achieved, among other that items which are not properly engaged by the conveyor belt, for example items that have contacted the conveyor belt and due to their stickiness are moved along the course, will be released and will fall down. Thus, the sequence of items being transferred with the predetermined distances will not be disturbed by such a "falsely" transported item. According to further advantageous embodiments, as specified in claim 3, said vacuum transport zone may be arranged for extending in an angle in relation to the horizontal level, said angle being comprised in the interval from 45° to 90°, in a further preferred form in an interval from 60° to 90°, in a still further preferred form in an interval from 75° to 90°, in an even further preferred form in an interval from 80° to 90° and in a still even further preferred form in an interval from 90° to 135°.

According to a particular advantageous embodiment, as specified in claim 4, said vacuum transport zone may be arranged in such a manner that an item that is not properly engaged by the conveyor belt or that is released during vacuum transport, will re-enter a feeding location for the device, e.g. fall down to the feeding location.

Hereby, it is achieved that such items that are not gripped or that are released during the transfer, do not require special facilities or operations for being offered for transfer again. Thus, catching means, recirculation conveyors, etc. are not needed, thereby facilitating a cost-efficient and uncomplicated transfer arrangement, when using a device according to the invention.

Preferably, said device may comprise at least one further friction transport zone, whereby it is achieved that in addition to the friction transport zone located after the vacuum transport zone, a further friction zone may be located prior to the vacuum transport zone, thus giving the advantage that the items are offered to the vacuum transport zone by the device itself and that for example the items that are fed to the device, can be for example be dropped over a larger area and not necessarily with accuracy.

Advantageously, as specified in claim 5, said vacuum communication means may comprise surface vacuum communication means arranged in said base part, said surface vacuum communication means comprising at least one indentation or cavity being arranged in the longitudinal direction of said conveyor belt.

Hereby, it is achieved that the vacuum may be communicated to the openings in the conveyor belt in an expedient manner.

Preferably, as specified in claim 6, said at least one indentation or cavity may be a groove or channel in the surface of said support part of the base part.

Hereby, it is achieved that the vacuum may be communicated to the openings in the conveyor belt in an expedient and relatively simple manner, for example in that the vacuum can be provided over the entire effective length of the vacuum transport zone using only a single groove or channel that need simply to be connected to the vacuum source at a single location.

Advantageously, as specified in claim 7, said vacuum communication means may comprise a connection from said at least one indentation or cavity via said base part to a source of vacuum.

Hereby, a relatively simple and cost-efficient layout of the vacuum communication arrangement is achieved.

Preferably, as specified in claim 8, said at least one indentation or cavity may be placed in a lateral position corresponding to the lateral location of one or more of said plurality of openings formed in the conveyor belt.

Hereby, it is achieved that the vacuum is offered directly to the openings in the conveyor belt. It is noted that the openings in the conveyor belt may be arranged in a plurality of parallel rows and that in this case at least a corresponding number of indentations or cavities must be present, preferably placed in similar parallelism.

According to a further preferable embodiment, as specified in claim 9, said surface vacuum communication means may comprise a plurality of indentations or cavities, e.g. grooves or channels, being arranged in the longitudinal direction of said conveyor belt, e.g. lying end to end.

Hereby, a number of advantages can be achieved in as each of the indentations or cavities making up the complete vacuum transport route must be connected to the vacuum source. Thus, the vacuum or suction effect can be controlled, for example in such a manner that the suction effect is greater at the position, where the items are gripped, since it may be necessary to effectively establish a contact between the item and the opening, e.g. in order to draw the item to the belt. When the item has been gripped or engaged, the vacuum may be reduced, for example by having restrictions in the vacuum connections to the indentations or cavities following the first indentation or cavity in a row. Other means and manners of controlling the vacuum to the individual indentations or cavities are possible, for example also in order to disconnect vacuum when an opening, to which an item has not been drawn, is passing in order to avoid loss of vacuum effect.

Advantageously, as specified in claim 10, said surface vacuum communication means may comprise a plurality of indentations or cavities, e.g. grooves or channels, being arranged in a plurality of locations in the lateral direction corresponding to the lateral locations of said plurality of openings formed in the conveyor belt.

Hereby, it is achieved that the capacity of the device is enhanced, i.e. by having the openings in the conveyor belt arranged in a plurality of parallel rows and by having at least a corresponding number of indentations or cavities present in the first part of the base part, preferably placed in similar parallelism.

According to a further embodiment, said at least one indentation or cavity may be arranged in said vacuum transport zone, e.g. in said first part of the base part.

It is noted in this respect that indentations or cavities for vacuum communication may be present also in a friction transport zone, e.g. in a boundary zone, for example in order to assure that an item is not lost while it is being transported to the friction transport zone, or for example in a preceding zone, where the items may actually be gripped already while they are lying on e.g. the horizontally oriented belt.

According to a further embodiment, said one or more friction transport zones may be located prior to and/or subsequent to said vacuum transport zone.

Hereby a further enhanced flexibility may be achieved, e.g. since the transport path can be arranged with an even higher degree of freedom as regards e.g. the inlet position, the elevation, the outlet position, the involved angles etc.

Advantageously, as specified in claim 11, said device may comprise means for facilitating the removal of the suction effect between the vacuum transport zone and a subsequent friction transport zone.

Hereby, it is achieved that the items are allowed to leave the conveyor belt at the predefined outlet position, since a vacuum that has been built up in the space defined by an opening in the belt, the item placed on top of the opening and the base part beneath the belt, are allowed to escape, for example by providing a certain amount of free space between the belt and the base part at a specific location.

Preferably, as specified in claim 12, said means for facilitating the removal of the suction effect between the vacuum transport zone and a subsequent friction transport zone may involve the use of pneumatic means, e.g. for supplying e.g. a gas such as air to suction holes in the conveyor belt.

Hereby, it is further achieved that the items are actively released from the opening and in particular the surface of the belt surrounding the opening. This is of particular importance when for example sticky food items are concerned, since these may tend to stick to the belt even though the suction effect has been removed. When for example air is e.g. blasted through the opening, the item will be loosened or released from the opening and its surrounding and will afterwards not tend to stick to the surface again.

Advantageously, as specified in claim 13, said device may further comprise means for performing a cleaning of the suction holes.

Hereby, it is assured that the openings in the belt are kept clean and free from build-up of fibres or the like from the items and that furthermore a high hygienic level is maintained.

According to a still further embodiment, as specified in claim 14, said device may be adjustable as regards the inclination of the vacuum transport zone.

Hereby, it is achieved that the device may be designed for a wide range of applications and items.

Preferably, as specified in claim 15, said device may be tiltable.

Hereby, it is achieved that the device may be adapted for different applications, sites and items and furthermore that the device may be adjusted during use, if necessary or desired. Also, when the device is tiltable, a bulk of items, for example in a container, may be placed at the feeding position while the device is tilted backwards, and thereafter the device may be tilted to a normal position, ready for transferring the items. Furthermore, the device may arranged with its inlet end placed on top of the bulk of items and as the items are transferred, the device may automatically adjust its inclination correspondingly.

According to a still further advantageous embodiment, as specified in claim 16, said device may comprise a plurality of conveyor belts, each comprising a plurality of openings formed in the conveyor belt, and each being assigned a corresponding support part of a base part.

Hereby, a desired capacity may be achieved in a relatively simple and cost-efficient manner, for example simply by placing the necessary number of devices and/or belts together in parallel, possibly using a base part that has been constructed by putting together modules, etc.

Preferably, as specified in claim 17, said device may further comprise a plurality of friction transport zones, e.g. one or two for each conveyor belt.

Hereby a number of advantages may be achieved, for example as regards the flexibility of the device.

Advantageously, as specified in claim 18, said plurality of conveyor belts may be individually adjustable, e.g. as regards the inclination, the position where items are delivered and/or picked-up, etc.

Hereby additional flexibility is achieved, which may be preferable in view of the preceding operation and/or the subsequent handling, processing etc. Furthermore, it is noted that the device may be adjusted during operation, for example automatically controlled.

According to a further advantageous embodiment, as specified in claim 19, said plurality of conveyor belts may comprise friction transport zones, which may be arranged differently, e.g. angled in relation to each other.

Hereby it is achieved that a spreading of the transferred items can be achieved, which may be preferable for the subsequent handling, processing etc. Furthermore, items may be picked-up from different sources and/or locations.

According to a still further advantageous embodiment, as specified in claim 20, said plurality of friction transport zones may be adjustable.

According to a particular advantageous embodiment, as specified in claim 21, said conveyor belt may comprise at least one longitudinally extending element on the rear, e.g. a bead or the like, which is located laterally corresponding to said at least one indentation or cavity in said support part of said base part.

Hereby, it is achieved that that belt may be positioned/fixed laterally in relation to the base part. Furthermore, such a longitudinally extending element my furthermore serve as a drive element for the belt.

Preferably, as specified in claim 22, said at least one longitudinally extending element on the rear of said conveyor belt may comprise vacuum communication means, e.g. in the form of passages, for communicating vacuum to said suction holes.

Hereby, it is achieved that the openings will have a relatively large dimension axially, i.e. the length of the passage defined by the opening, when compared with an opening in the flat part of the belt, whereby it is assured that fibres etc. of the items, e.g. the pieces of meat, are not pulled down the opening to such a extent that they emerge on the rear side of the belt, where they will get caught between the belt and e.g. the base part, for example when passing onto the friction transport zone, thus giving rise to operational difficulties.

Advantageously, as specified in claim 23, said conveyor belt may comprise means such as for example a toothing or a row of holes for cooperation with drive means, for example a gear wheel on a drive motor.

Hereby, it is achieved that the belt may be driven in an expedient manner.

Further, as specified in claim 24, said device may comprise means for tightening said conveyor belt, e.g. in the form of adjustable means related to the support of a drive motor, a roller or the like.

Hereby, an easy and uncomplicated manner of facilitating e.g. the removal of the belt is provided, whereby the belt, the base part and other components may easily be cleaned and further, the belt may easily be exchanged, for example when it is desired to use a belt having another size or type of openings, another distance between openings etc.

The invention also relates to a method of transferring items, in particular food items such as pieces of meat, said method comprising the steps of
feeding said items to a vacuum transport conveyor, by means of which said items are elevated,
transferring said items from said vacuum transport conveyor to a friction transport conveyor,
delivering said items from said friction transport conveyor to further processing, weighing/determination of weight, handling, packaging and/or further transport etc., whereby said transport by said vacuum transport conveyor and said transport by said friction transport conveyor is performed using an endless conveyor belt arranged in a course comprising a vacuum transport zone and a friction transport zone.

Hereby it is achieved that the items can be gripped and transferred in such a manner that they will be placed with at least a predetermined distance in relation to each other, and further it is achieved that the items are readily provided for further handling, weighing, processing etc., since the friction transport zone will deliver the items directly at a desired location, meaning that it is not necessary to have special conveyor means for picking the items from the vacuum transport zone. Thus, the flexibility of the conveyor belt is taken advantage of not only for performing a vacuum transport, but also for providing a transport in e.g. a horizontal direction. Thus, it will be seen that a hitherto unseen flexibility is achieved, that the vacuum transport zone can be arranged with a higher degree of freedom as compared to the prior art and that the vacuum transport zone may for example be arranged with a relatively steep inclination and in such a manner that the inlet end of this zone is located directly at or above e.g. a feeding conveyor or another type of feeding means, whereby it is achieved that items that are not gripped or that falls down after having been transported e.g. a small distance, will fall down on or into the feeding means and may readily be gripped by the vacuum transport zone again.

Preferably, as specified in claim 26, said vacuum transport zone may be arranged for extending essentially vertically.

Hereby, a number of advantages are achieved, among other that items which are not properly engaged by the conveyor belt, for example items that have contacted the conveyor belt and due to their stickiness are moved along the course, will be released and will fall down. Thus, the sequence of items being transferred with the predetermined distances will not be disturbed by such a "falsely" transported item.

Advantageously, as specified in claim 27, said vacuum transport zone may be arranged for extending in an angle in relation to the horizontal level, said angle being comprised in the interval from 45° to 90°, in a further preferred form in an interval from 60° to 90°, in a still further preferred form in an interval from 75° to 90°, in an even further preferred form in an interval from 80° to 90° and in a still even further preferred form in an interval from 90° to 135°.

According to a further advantageous embodiment, as specified in claim 28, an item that is not properly engaged by the vacuum transport conveyor when being elevated or that is released during said vacuum transport, will re-enter a feeding location for the device, e.g. fall down to the feeding location.

Hereby, it is achieved that such items that are not gripped or that are released during the transfer, do not require special facilities or operations for being offered for transfer again. Thus, catching means, recirculation conveyors, etc. are not needed, thereby facilitating a cost-efficient and uncomplicated transfer arrangement, when using a device according to the invention.

THE FIGURES

Figure 2:
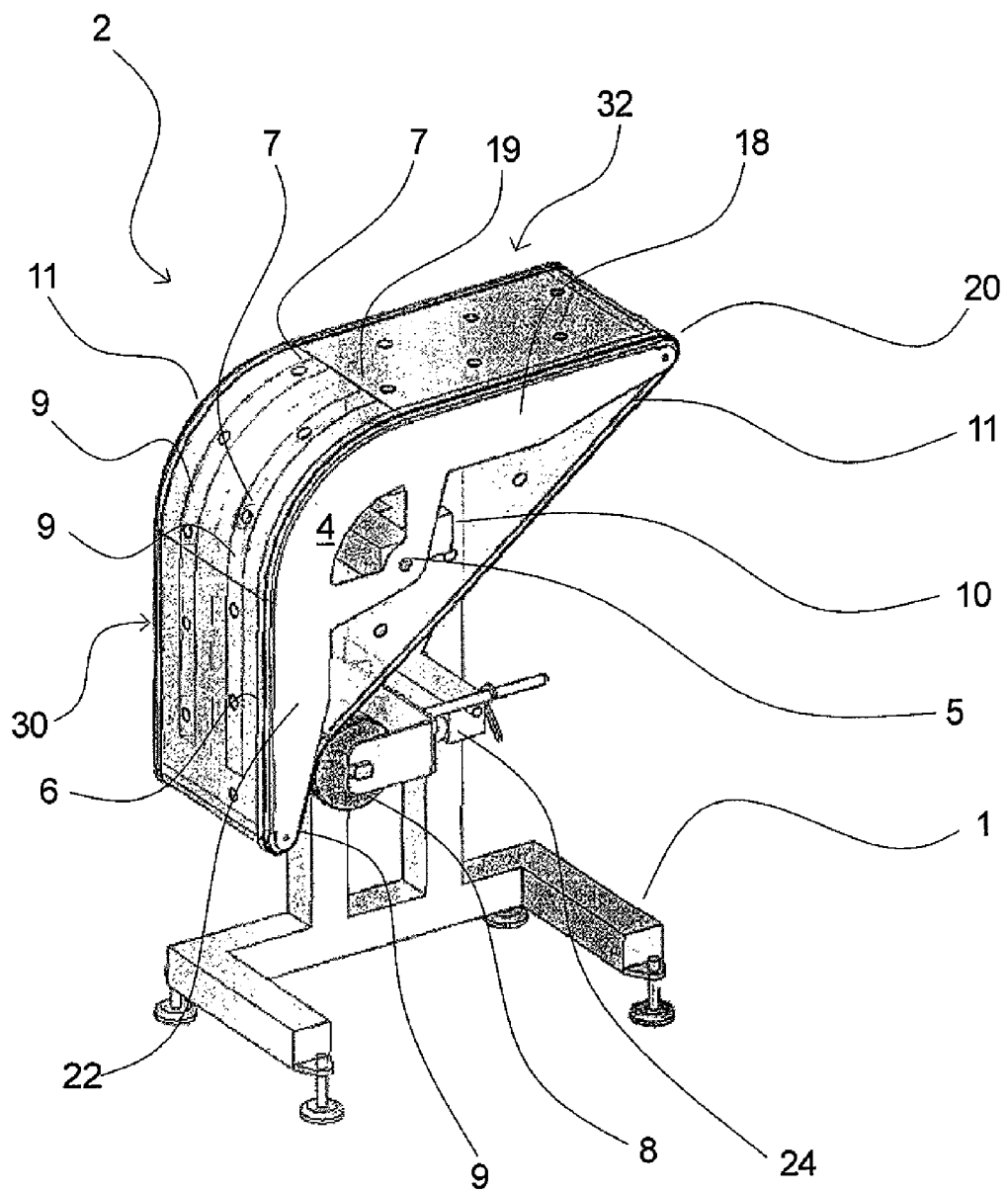
Figure 3:
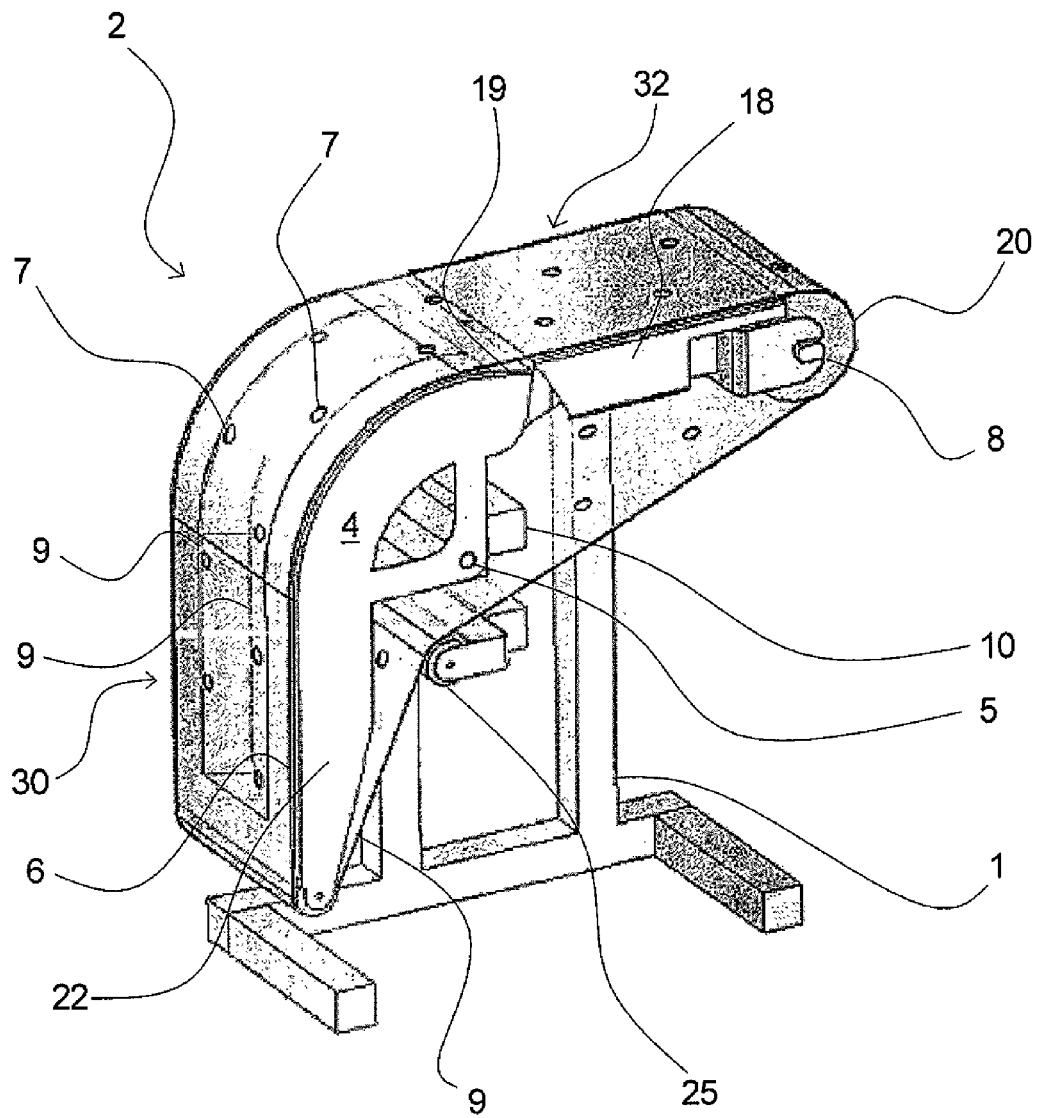
Figure 4:
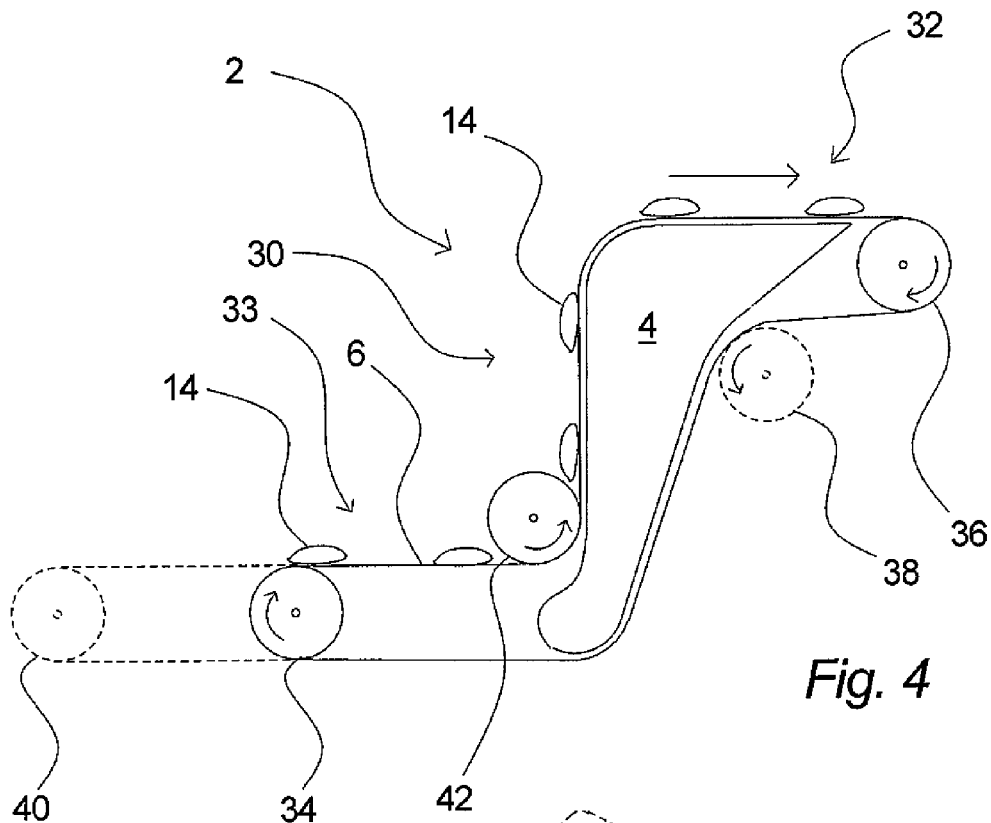
Figure 5:
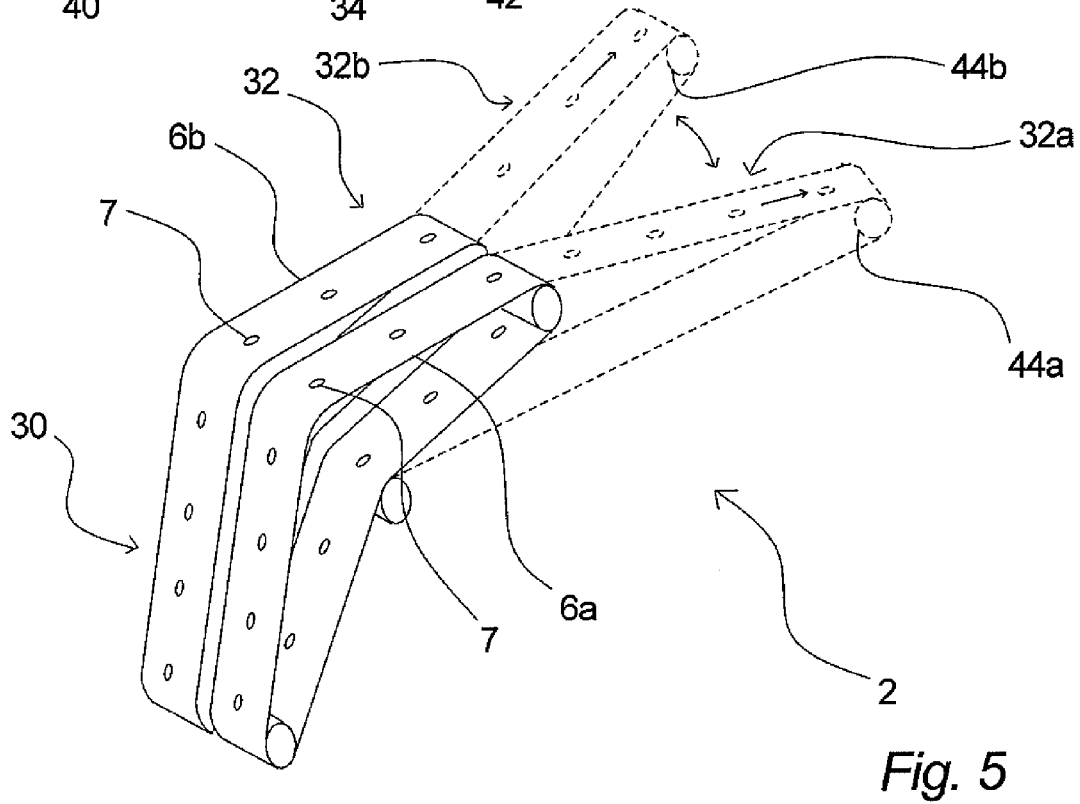
Figure 6:
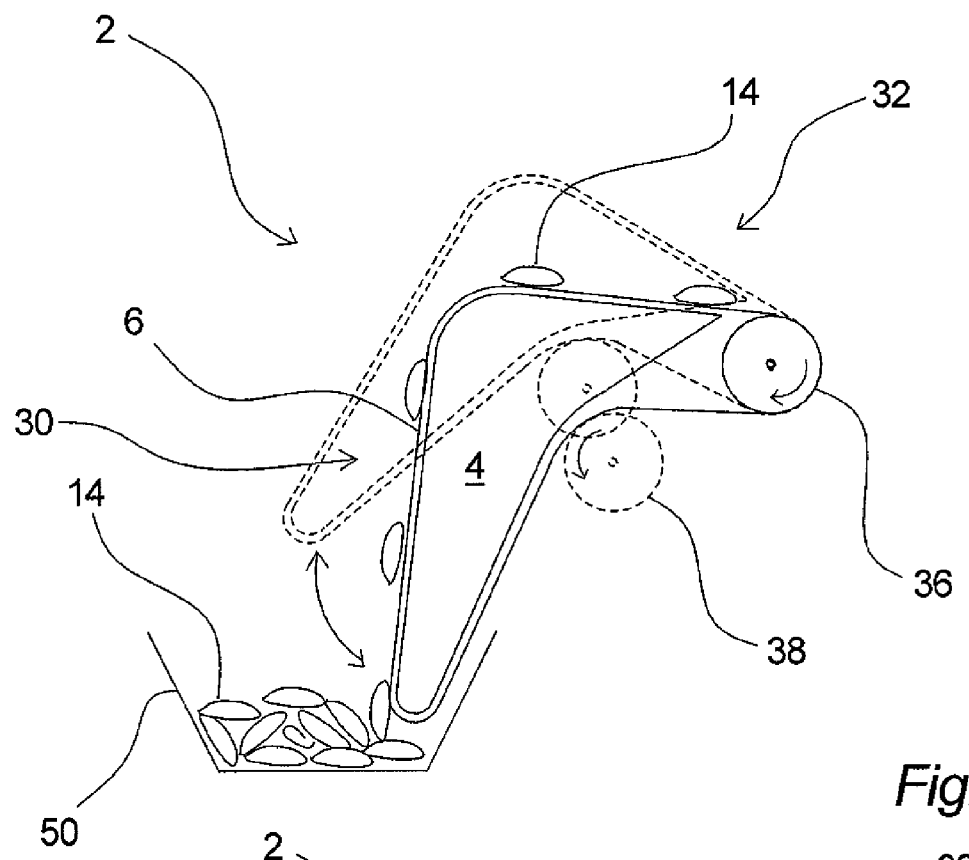
Figure 7:
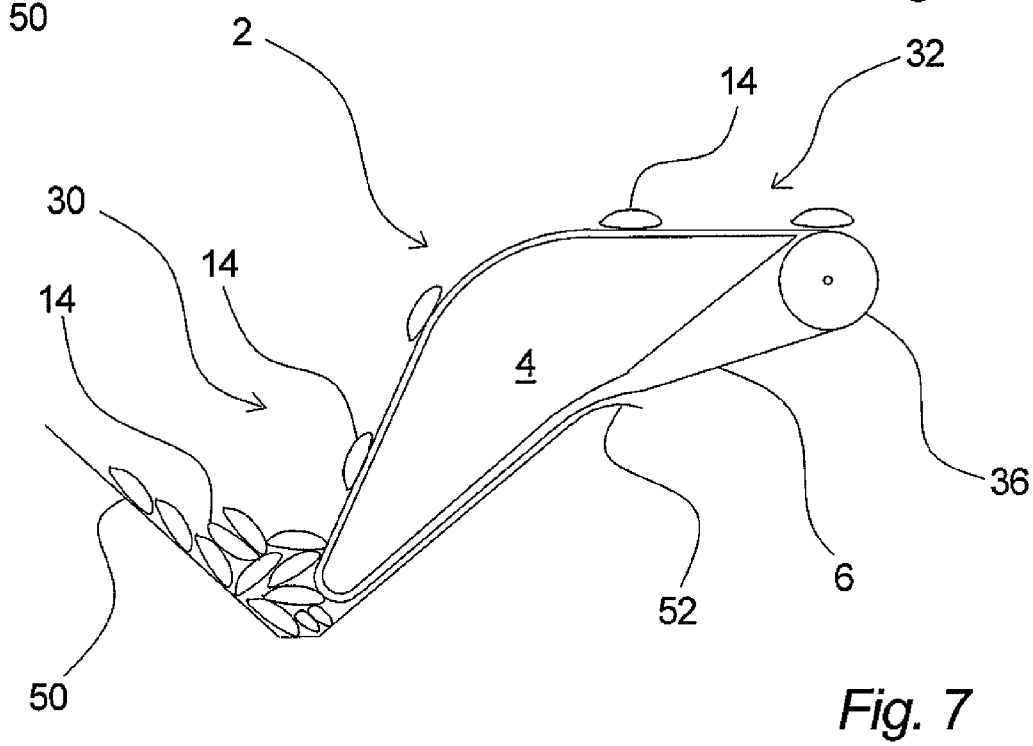
Figure 8A:
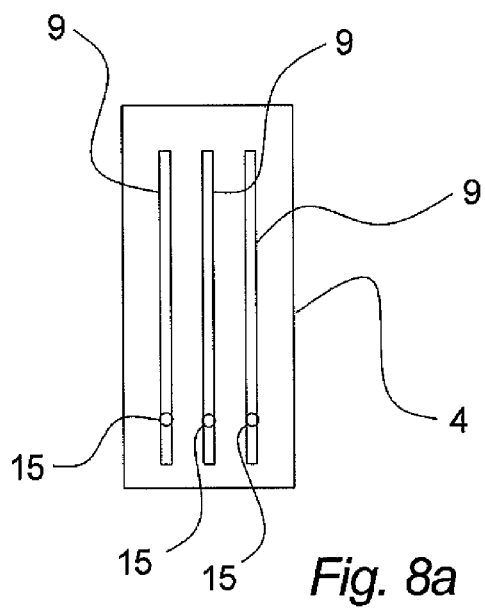
Figure 9:
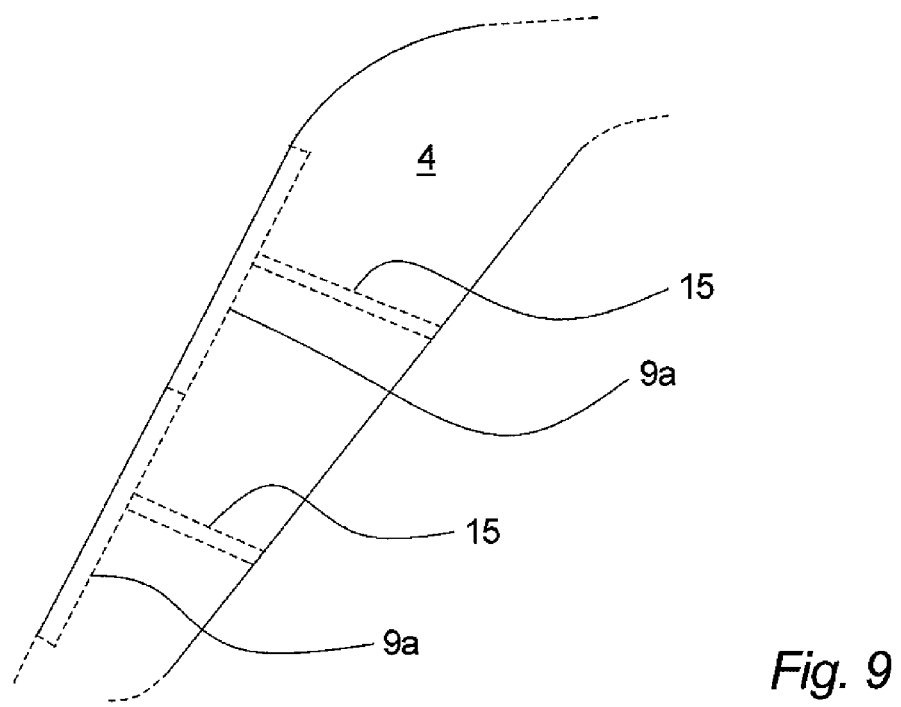
Figure 10:
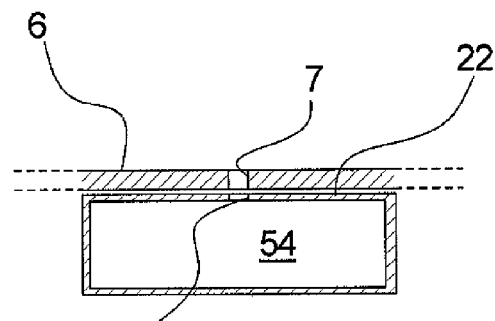
Figure 11:
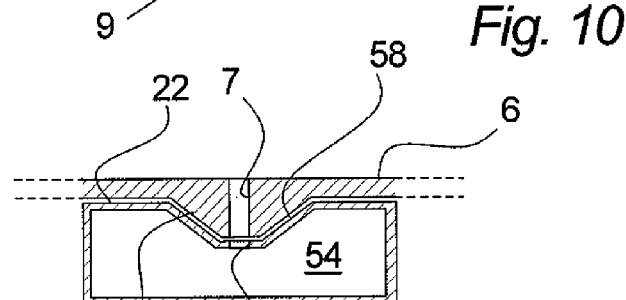
Figure 12:
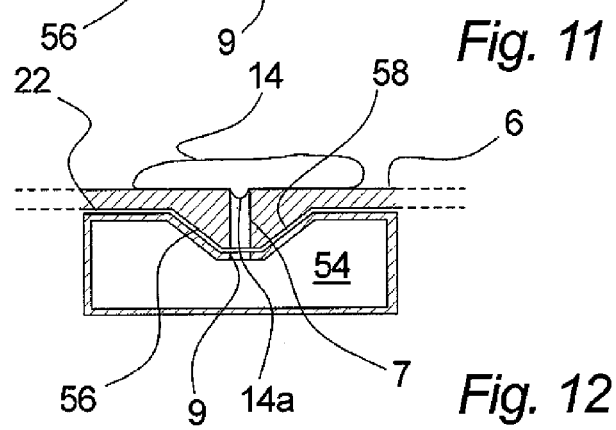
Figure 13:
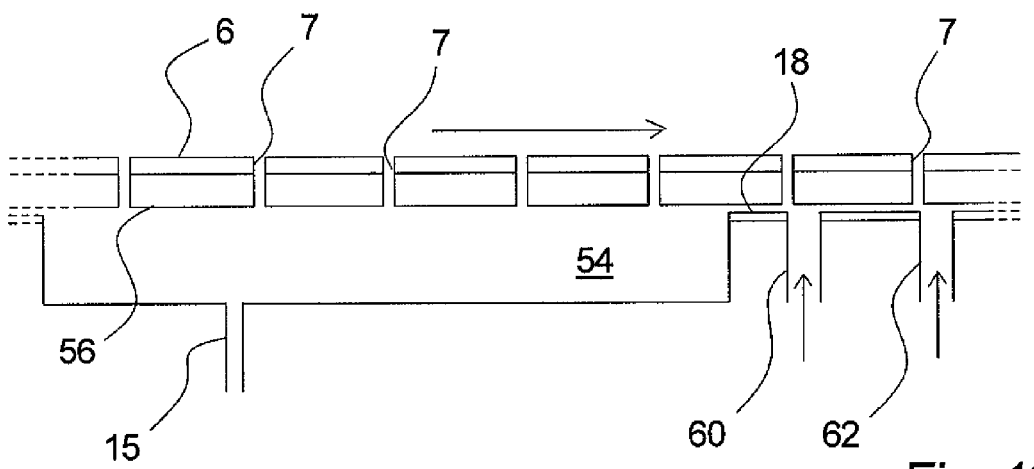

The invention will be explained in further detail below with reference to the figures of which FIG. 1 shows in a schematic manner and in a side view a system, wherein a device according to an embodiment of the invention is used, FIGS. 2 and 3 show further embodiments of transfer devices according to the invention in perspective views, FIG. 4 shows in a schematic manner and seen from the side a further embodiment of a transfer device comprising different designs of an inlet arrangement, FIG. 5 shows in a schematic perspective manner a further embodiment, using a plurality of belts and with the option of delivering items to different locations, FIG. 6 shows in a side view a further embodiment for transferring items from e.g. a container, FIG. 7 shows a similar embodiment, where the transfer device may be integrated with the container, FIG. 8a and b show a base part with different embodiments of the indentations or cavities in the surface of the base part, FIG. 9 shows in a schematic view part of a base part seen from the side, FIGS. 10-12 show sectional views of different embodiments of part of a belt and corresponding parts of the base part, FIG. 13 shows schematically a vacuum transport zone and the subsequent friction zone, and FIGS. 14-17 show different embodiments of a conveyor belt in accordance with the invention.

DETAILED DESCRIPTION

In FIG. 1 a system for e.g. transport and handling of items 14 is shown, which system comprises a device 2 according to an embodiment of the invention. As shown, items 14 are fed to the device 2 by means of feeding means in the form of a feeding conveyor 12. The items 14 may be fed to the device 2 in an unorderly form, e.g. without having been purposely arranged in a specific order, pattern or arrangement, and the items may even be intermingled and overlapping each other. However, it will be understood that the items may be delivered in various other manners, e.g. separated from each other, with distance to each other, in bulk, etc. and combinations hereof. By means of the device 2, these items 14 will be transferred to for example an outlet conveyor 16 and in such a manner that the items will be delivered with a predetermined distance.

The device 2 comprises a base part, which in general is designated 4, and an endless conveyor belt 6, which also will be referred to as a vacuum belt. This belt 6 can be driven by means of for example an electric motor 8. The base part 4 serves as a support for the belt 6, in particular at the locations where the vacuum belt 6 carries items 14. Furthermore, as it will be explained in further detail below, the base part also serves for transferring or communicating vacuum to suction holes in the vacuum belt 6, which suction holes also will be described in the following. The vacuum may for example be delivered or produced by a vacuum source such as for example a vacuum pump (not shown in FIG. 1), which as schematically illustrated in FIG. 1 can be connected to the base part 4 by means of a pipe connection 10. The vacuum source, e.g. the vacuum pump may possibly form part of the device 2 or otherwise be integrated in or combined with the device 2.

The base part 4 comprises in the embodiment shown in FIG. 1 a first part 22, which essentially extends vertically, and a second part 18, which extends substantially in a horizontal direction. It is apparent that these parts may be arranged having other angles. The first part 22 comprises one or more indentations or cavities, e.g. channels or grooves for communicating vacuum to suction holes in the belt 6, whereby items 14 that reach this part of the belt 6, are caught by the vacuum belt and transported/lifted upwards by the belt 6 as shown in FIG. 1. The one or more channels or grooves 9 is/are indicated in FIG. 1 by means of a dash line and will be explained in further detail later on. From the first part 22 the base part 4 extends into the second part 18, where the vacuum is disconnected from the vacuum belt 6. As shown, the indentations or cavities, e.g. the one or more channels or grooves 9 may extend from a zone of the first part 22, where the items are caught, and up to the second part 18 at a place, where the items can stay on the belt under influence of gravity (and friction) alone. At the end 20 the items are released and delivered to the outlet conveyor 16.

The zone of the device, where items are caught and transported by the conveyor belt 6 due to the effect of the vacuum may be referred to as a vacuum transport zone 30 as shown in FIG. 1 and the zone, where items are transported essentially by the belt under influence of gravity (and friction) alone may be referred to as a friction transport zone 32 as shown in FIG. 1.

In FIG. 1 the surface of the first part 22 of the base part 4 is shown having a relatively flat shape, while the surface of the second part 18 of the base part 4 is shown having a rounded shape. It will be understood that various other shapes may be used and that for example both parts may be flat or rounded or any other suitable shape. It will be understood, though, that the shape of these parts in the lateral direction normally will be essentially flat, even though other shapes may be preferable as well. Furthermore, it will be understood that the inclination of the first part 22 which is shown as being substantially vertical in FIG. 1, may vary, for example by having different angles between the first part 22 and the second part 18 or the inclination of the base part 4 may be altered or adjusted, which will also be exemplified further in the following.

Thus, the vacuum transport zone 30 may for example be arranged for extending in an angle in relation to the horizontal level, where the angle may be from 45° to 135°. The angle may be in the interval from 45° to 90°, it may be in an interval from 60° to 90°, it may be in an interval from 75° to 90°, it may be in an interval from 80° to 90° or it may be in an interval from 90° to 135°. Thus, the vacuum transport zone may be tilted backwards as well as forwards and may be essentially vertical.

Embodiments of the invention as exemplified in FIG. 1 will be described in further detail with reference to FIGS. 2 and 3, which show transfer devices 2 in perspective views. Both of these devices comprise a frame 1 for supporting the device 2, and the base part 4 may be connected to the frame 1 in such a manner that the base part 4 can be adjusted as regards e.g. the inclination etc. For example, the base part 4 may be carried in such a manner that it can be pivoted, e.g. about an axis 5. The conveyor belt 6 comprises suction holes or openings 7, which preferably are placed with a predetermined distance to each other in the longitudinal direction of the belt 7, i.e. the transport direction, whereby items transferred by the device will be delivered one by one to e.g. an outlet conveyor belt 16 (cf.

FIG. 1). The suction holes 7 may be located in one, two (as shown in FIGS. 2 and 3), three or possibly more parallel rows. Furthermore, it is noted that where two or more rows are involved, the suction holes 7 in the respective rows may be placed next to each other or they may be displaced in relation to each other as shown for example in FIGS. 2 and 3, where holes in one row are displaced a distance corresponding essentially to half the distance between two holes in the rows. It is also noted that the distance between holes 7 in the rows may be equal, but the invention also relates to embodiments having different distances between holes in different rows.

In the surface of the base part 4 one or more indentations or cavities, e.g. channels or grooves 9 is/are located, corresponding to the lateral location(s) of the suction holes 7 in the conveyor belt 6. These indentations or cavities are in communication with a vacuum source, for example a vacuum pump, which is connected to e.g. pipes, tubes, channels or the like leading to the indentations or cavities. These connections are illustrated by the reference number 10 in FIGS. 2 and 3. It will be understood that a vacuum pump may be located e.g. adjacent to the transfer device 2, at a distance, for example if a single vacuum pump is servicing a plurality of transfer devices, or it may be e.g. integrated with the transfer device 2.

As shown, vacuum grooves or channels 9 are formed in the first part 22 and in the part of the base part 4 leading to the part 18, e.g. via a curved part or in another manner facilitating the transfer from e.g. an essentially vertical part to an essentially horizontal part. An item that is brought in contact with the belt 6, will immediately or eventually be engaged by a suction hole 7 in the moving belt and be transported in a upwards direction by the belt 6. When the item reaches the end of the vacuum transport zone 30, the vacuum communication to the suction hole 7 will be disrupted, which may take place in a number of ways, one of which being that the groove or channel 9 is ended here, whereafter the suction hole in question will be sliding along the essentially flat surface of the base part 4, whereby the suction effect will disappear. The surface of the base part 4 may be designed in order to facilitate the disappearance of the suction effect, for example by having the surface equipped with small grooves, elevations or the like in a predetermined area for releasing the vacuum. As shown in FIGS. 2 and 3, the base part 4 may be designed with a transverse depression 19 at the border zone between the vacuum transport zone 30 and the friction transport zone 32 for facilitating the release of the suction effect. Instead of a depression 19 a transverse ridge or the like may be provided having a similar effect. Furthermore, passages or the like may be provided in the base part 4 for facilitating the release of the suction effect. According to a further embodiment, the device may be designed in such a manner that e.g. air may be led to the suction holes 7, for example immediately after they have entered the friction transfer zone 32, whereby it is assured that the suction effect is removed and further, when for example sticky items are transferred, it is assured that the item will not be sticking to the belt, which might otherwise cause problems when the items are transferred from the device 2 to e.g. other handling means, conveyors, cf. for example the conveyor 16 in FIG. 1. It will be understood that e.g. compressed air may be used herefore and further it will be understood that the pressure of the compressed air, when led to the suction holes 7, will be appropriately controlled, e.g. in order to avoid that the items are removed from their locations on the belt 6 determined by the locations of the holes 7.

When an item enters the friction transport zone 32, it will be transported further on by the conveyor belt 6, e.g. horizontally, but possibly also with an inclination upwards or downwards having a maximum value limited by the friction characteristics of the belt 6 as mentioned above. When the item reaches the end 20 of the zone 32, it will be transferred for further transport, cf. e.g. the outlet conveyor 16 in FIG. 1, or for further processing, weighing/determining the weight, grading, batching, packaging etc., which will be apparent to a person skilled in the art.

Furthermore, at a location, where the items have left the conveyor belt 6, for example at the lower run of the belt immediately after the roller 36 (cf. FIGS. 6 and 7), means may be provided for cleaning the suction holes 7 if necessary, for example by blowing air and/or steam through the holes or by using a liquid, that is e.g. pumped or squirted through the holes 7. Preferably, such cleaning is performed at a location, where the medium used for the cleaning and possible impurities and fragments will not get in contact with e.g. the items 14.

The conveyor belt 6 is as mentioned above of the endless type and is supported by the base part 4 and possibly a drive arrangement such as e.g. an electric motor 8, a motorized conveyor drum etc. Further, other rollers, wheels, drums or the like may be applied, for example placed at the ends of the base part 4. Furthermore, separate means may be provided for tightening the conveyor belt 6, when it has been placed on the base part 6 and about other rollers etc. For example as shown in FIG. 2, the drive motor 8 may be adjustable by means of adjustable motor support 24, whereby also en expedient release, change etc. of the belt 6 is facilitated. As shown in FIG. 3, the drive motor 8 may be located as a fixed support roller in the transfer assembly and instead a separate adjustable roller 25 may be used for tightening and releasing the conveyor belt 6, which roller is adapted for applying force to the rear of the belt 6 in its lower run.

It will be understood that when a tightening arrangement, e.g. 24 or 25, has been loosened, the conveyor belt 6 may easily be removed from the device, for example for cleaning and/or for replacement with another belt, for example a belt of another type, a belt having another type, number of suction holes and/or distance between holes, etc., for example a type of belt designed for another type of items, another size of items etc.

It is noted that the conveyor belt 6 can be adapted with e.g. a toothing 11 (cf. FIGS. 16 and 17) located as indicated in FIG. 2, for example along one or both edges of the belt. Such a toothing may for example be toothed belts in connection with the conveyor belt or it may be a toothing integrated with the belt during manufacture etc. Hereby, the conveyor belt 6 may be driven by means of this toothing, for example by a gear wheel on the drive motor. Instead of a toothing the belt can be provided with holes, indentations or cavities arranged in one or more rows (not shown in FIG. 2), for example along one or both edges of the belt, for cooperation with drive means such as one or more gear wheels on the drive motor Other manners of driving the conveyor belt 6, using other means, are possible, which will be apparent to the skilled person.

A further embodiment of a transfer device 2 comprising different designs of an inlet arrangement is shown in a schematic manner and seen from the side in FIG. 4.

This embodiment is in essence designed as the examples described above, e.g. with a base part 4 for the conveyor belt 6 and rollers 36 and possibly 38, one of which may comprise a drive motor. However, in addition to the vacuum transport zone 30 and the friction transfer zone 32 a further friction transfer zone 33 is provided as a pick-up arrangement for the items 14. A further roller 34 may be comprised in this arrangement, placed in such a manner that the belt 6 at this lower part defines an essentially horizontal or only slightly inclining transport path. In order to maintain the desired belt path, means may be arranged to achieve that the belt engages the base part 4 at the lower end where the vacuum communication is being initiated, for example in the form of one or more wheels 42 or the like, which forces the belt towards the base part. It will be understood that this/these wheel(s) 42 or the like is/are designed and/or located in order to allow the items 14 to pass. The wheel(s) 42 may for example be placed in such a manner that it/they only engages the belt 6 at location(s), where suction holes are not present, leaving the area with the suction holes and a neighbouring area corresponding at least to the item size free.

As indicated by dashed lines in FIG. 4 and by the roller 40, such an pick-up arrangement comprising a further friction transfer zone 33 may be designed with various dimensions in consideration of the application, the type of items etc. It will be understood that the arrangement may serve a number of purposes, one of which being an improved inlet arrangement for the transfer device. Furthermore, a feeding conveyor as such may be completely avoided, thereby reducing costs and reducing complexity. Also, the items may be fed directly to the transfer device 2, for example by dropping items on the belt 6 in the further friction transfer zone 33.

It is noted that two or more of the devices 2 described above may readily be placed together in parallel, if a specified or an increased capacity is needed. However, it will be understood that a device 2 may also be designed comprising a conveyor belt having a width and a number of rows corresponding to the particular needs.

In FIG. 5 a further embodiment is shown schematically in a perspective view. This embodiment illustrates both an arrangement, where two or more separate devices are placed together, e.g. "grouped" as a single device, and an arrangement, where a purpose-built device 2 is used, for example a device comprising two or more conveyor belts being driven in parallel. As shown, the device 2 comprises two conveyor belts 6a and 6b, each one having suction holes 7. As shown, each belt may have a single row of suction holes, but it will be understood that each belt may have more than one row of suction holes. Furthermore, the belts are supported on a base part and supported and/or driven by rollers and in general designed in accordance with, what has been explained above, e.g. with a vacuum transport zone 30 and a friction transport zone 32.

The two belts 6a and 6b may be arranged differently, for example delivering the items at different levels, to different outlet conveyors etc., and as shown with dash lines, one or both of the belts may comprise a prolonged friction transfer zone, e.g. 32a and 32b, respectively, by using belts with a greater length and having end rollers 44a and 44b, respectively. Hereby, the difference between the end locations may be increased, and as shown the two belts may deliver items with a considerable distance apart, horizontally and/or vertically. Furthermore, in addition to that such a configuration can be static, the end locations of the belts 6a and 6b may be adjusted and even be automatically controlled, e.g. by controlling the position of the end rollers 44a and 44b.

In FIG. 6 a further embodiment of the device 2 is illustrated in a side view and in combination with a pick-up container 50, e.g. a bin, through, a vessel or the like, in which items 14 are placed, for example a container, which has been filled with items and has been relocated to the device for transferral of the items in an orderly form. The device is designed generally as described above and in such a manner that the lower edge of the device and the lower end of the vacuum transport zone can be brought into the container 50, whereby the items may engage the vacuum belt, be caught by a suction hole and be transferred from the container. As shown with dash lines, the device 2 is arranged to be tiltable, whereby a container may be removed and another one placed for transferral of the content. The device 2 may be pivotable about an axis placed near the roller 36 as indicated in FIG. 6, but preferably it is pivotable about an axis lying near the centre of gravity, whereby the power needed for tilting the device is minimal. It is noted that when a filled container is placed at the device, the device may be placed with the "nose" resting on the content of the container 50, and as the items are transferred, the device is allowed to sink correspondingly, whereby it is assured that essentially all items are transferred. It will thus be understand that it may be preferable that the device is supported in such a manner that it will be forced downwards with a predetermined small force, which will not harm the items, but will assure that the device follows the actual content in the container.

It is noted, though, that even though the device 2 shown in FIG. 6 is tiltable, in practice a limitation for the inclination has to be observed, since the inclination of the friction transfer zone 32 must not exceed an angle (in relation to horizontal) where an item located here will begin to slide down the belt instead of being transported on and together with the belt, and similarly the inclination of the vacuum transfer zone 30 must not exceed an angle (in relation to vertical), where an item may be caught and transported by the conveyor belt 6 due alone to the friction of the belt and/or the stickiness of the item itself. Thus, it will be understood that the friction characteristics of the belt will have to be considered when evaluating such limitations. Similar limitations as regards the angles will have to be observed for the other embodiments described herein, for example when designing these in practice and/or when adjusting and/or controlling these, e.g. during use.

In FIG. 7 an embodiment similar to the embodiment shown in FIG. 6 is shown, where the transfer device 2 may be integrated with the container 50.

As shown, means 52 may be provided at e.g. the edge of the container 50 for tightening the belt 6, for example a roller placed here or as shown a part of the edge of the container which is appropriately designed.

For this embodiment, the container 50 may preferably serve as receiving means for the items, that for example may be dropped into the container, and as a buffer or storage means for the inlet to the transfer device 2.

Figure 8B:
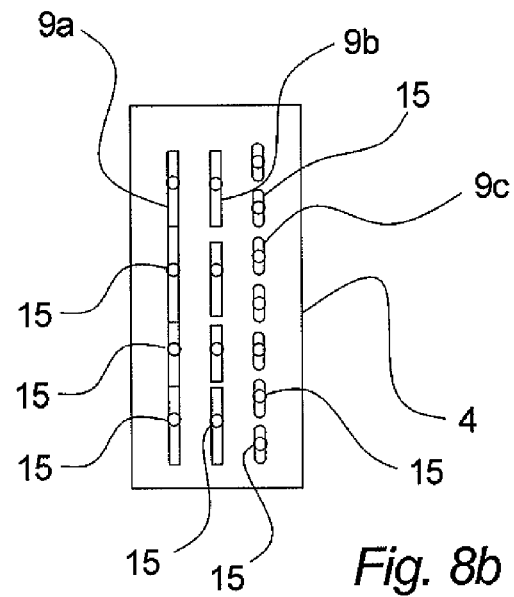

In FIGS. 8a and 8b different embodiments of the indentations or cavities in the surface of a base part 4, e.g. the channels or grooves 9, are illustrated. In these figures, the base part 4 is seen from the front in a schematic view. In FIG. 8a three longitudinal grooves 9 are shown, being placed in parallel and having essentially the same length. As shown, each one has an opening 15 which communicates with the vacuum source, e.g. through piping or the like 10, cf. FIGS. 1-3.

Further embodiments are shown in FIG. 8b, which essentially corresponds to FIG. 8a, but where the three grooves now are shown with different designs in order to illustrate different designs that can be used for different base parts. The groove 9a illustrates the groove being divided into a number of grooves lying end to end and each with an opening 15 for communication with the vacuum source. The groove 9b illustrates a design, where a space may be present between the individual grooves, and finally 9c illustrates a design, where the groove is formed of a number of individual grooves having an oblong shape and with rounded ends. It is noted that the grooves can have different lengths, for example with a relatively short groove at the lower end of the vacuum transport zone and one or more subsequent grooves that may be longer than the first groove. Further, some of the grooves may be slightly displaced laterally in order to accommodate for an overlap of the grooves in the longitudinal direction. Other designs will be apparent to the skilled person.

FIG. 9 shows in a schematic view part of a base part seen from the side and illustrating with dashed lines an example of the design of grooves 9a formed in the surface of the base part and the vacuum openings 15, which leads to the vacuum source via e.g. piping or the like 10 as shown in FIGS. 1-3. These vacuum openings 15 may for example be drillings, tubes, pipes etc. in the base part 4, which will be apparent to a skilled person.

In order to further exemplify the design of the conveyor belt 6 and the vacuum communication means a sectional view is shown in FIG. 10 of part of such a belt 6 and part of the first support part 22 of the base part. As schematically shown, the first support part 22 comprises a groove or channel 9 for communication with the suction holes 7 in the belt 6, and further it is shown that the support part 22 may comprise a vacuum chamber 54 or the like, which communicates with the groove or channel 9.

In FIG. 11 a modified design of such an arrangement is shown in a similar sectional and schematic view. Here, it is shown that the belt 6 may have a longitudinally extending element 56 in the form of a bead, a ridge or the like on the rear. This element 56, which extends along the total length of the endless belt 6, corresponds to a furrow or trough 58 in the support part 22. It will be understood that this furrow or trough 58 also extends along the whole support part of the base part 4 and other components, which the belt 6 passes when the device is operating. The groove or channel 9 for vacuum communication with the conveyor belt 6 is located in the bottom of the furrow or trough 58 as indicated in FIG. 11 for communication with the suction holes 7, which as shown according to this modified embodiment passes through the longitudinally extending element 56, e.g. the bead, the ridge or the like, whereby the suction holes has an extended length.

The longitudinally extending element 56 in the form of a bead, a ridge or the like may have a plurality of functions and advantages. It may serve as guiding means for the conveyor belt 6 in relation to e.g. the base part 4, since the longitudinally extending element 56 in combination with the furrow or through 58 will fix the belt in the lateral direction. A further advantage is illustrated in FIG. 12, which corresponds to FIG. 11, but further showing an item 14 being transported by the belt due to the suction effect. As shown, since the item 14 may be a foodstuff item that may have a relatively soft composition, the suction effect may have the effect that part of the item is drawn down the suction hole 7 as indicated by 14a. If a design of the conveyor belt 6 as shown in FIG. 10 is used, the length of the suction hole 7 will be relatively small, which may have the effect that a part 14a of an item, for example fibres, membranes or shreds of meat, may be drawn down the suction hole and possibly through the suction hole 7, whereby such a part 14a may contact parts of the base part 4, for example when the suction hole 7 passes from a vacuum transport zone to a friction transport zone, and thus hinder a smooth operation of the device and possibly bring the conveyor belt to a stop. This is avoided with the design as shown in FIGS. 11 and 12, since the length of the suction holes 7 in the belt is extended, whereby in practice no parts of the item 14 will be drawn so far down that contact with the support parts, e.g. the furrow or trough 58, will happen.

This is also illustrated in FIG. 13, which shows a design as indicated in FIGS. 11 and 12 seen from the side in a schematic view and, for the purpose of clarity, in a linear illustration. As shown, the conveyor belt 6 with the longitudinally extending element 56 on the rear and the suction holes 7 placed through the element 56 is moving from left to right in the figure. The vacuum chamber 54 or the like, which is connected to a vacuum source by means of a connection 15, supplies the suction holes 7 with vacuum in the vacuum transport zone until the suction holes 7 pass onto a friction transport zone, for example when passing onto the second support part 18 as indicated in FIG. 13, whereby the vacuum is disconnected. As previously mentioned, a medium such as for example air may be supplied to the suction holes in order to assure that the suction effect is relieved and in order to assure that an item is not sticking to the belt 6. This is indicated by the pipe connection 60, which may be connected to e.g. a compressed air source. A further embodiment of the invention is also illustrated in FIG. 13, which further embodiment relates to the cleaning of the suction holes 7, which may be effected by a cleaning medium such as for example compressed air, steam, water, possibly heated etc., that may be supplied via a cleaning connection 62. It will be understood that such a cleaning connection 62 will be placed at a location where the cleaning media pumped through the suction holes 7 will not get in contact with e.g. items being led to the device, items being transferred, items being delivered or items being further processed. The cleaning connection 62 may for example be placed at a lower run of the conveyor belt 6.

Figure 14:
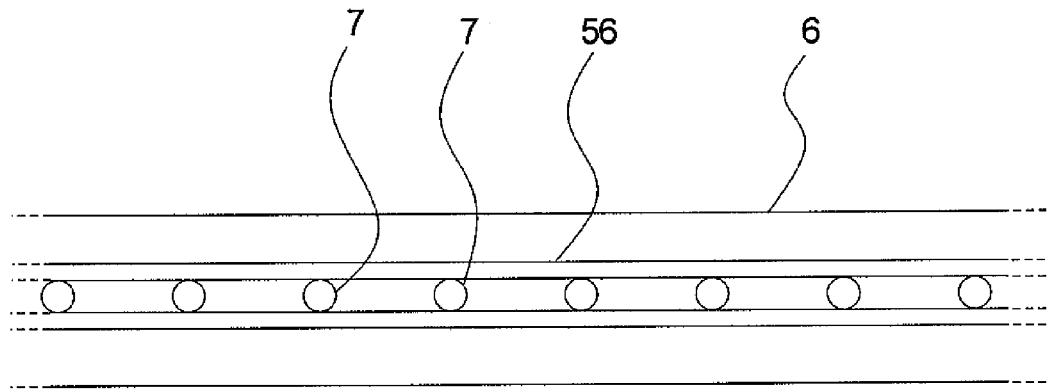
Figure 15:
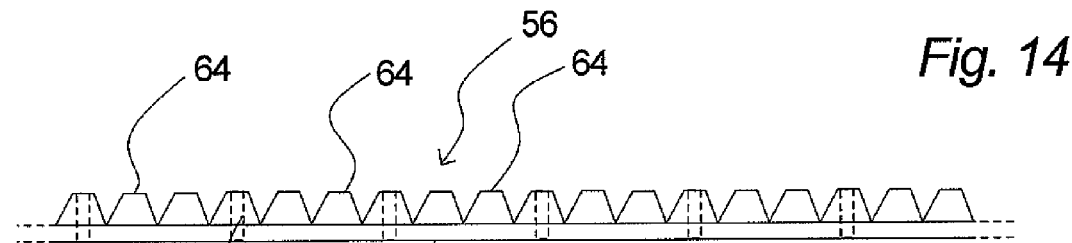

The belt construction shown in FIGS. 11, 12 and 13 is shown in FIGS. 14 and 15, seen from the rear and from the side, respectively. Thus, FIG. 14 shows the belt 6 with the longitudinally extending element 56, e.g. a bead or ridge, on the rear and the suction holes 7 placed through the element 56. If only one row of suction holes are use, the element 56 may be located in the middle, but it will be understood that two or more of such elements 56 may be used, for example corresponding to the number of rows of suction holes 7. Furthermore, as shown in FIG. 15, it is noted that the longitudinally extending element 56, e.g. a bead or ridge, may be serrated, e.g. being cut down as shown in order to allow the belt 6 to bend when passing e.g. roller or the like in its path along the base part 4 and the device in general. As shown, the form of the longitudinally extending element 56, e.g. a bead or ridge, may thus be tooth-shaped, and a further function may be the function of a drive element for the conveyor belt 6, since e.g. a gear wheel on a drive motor may interact directly with the toothing of the longitudinally extending element 56, e.g. the bead or ridge.

Figure 16:
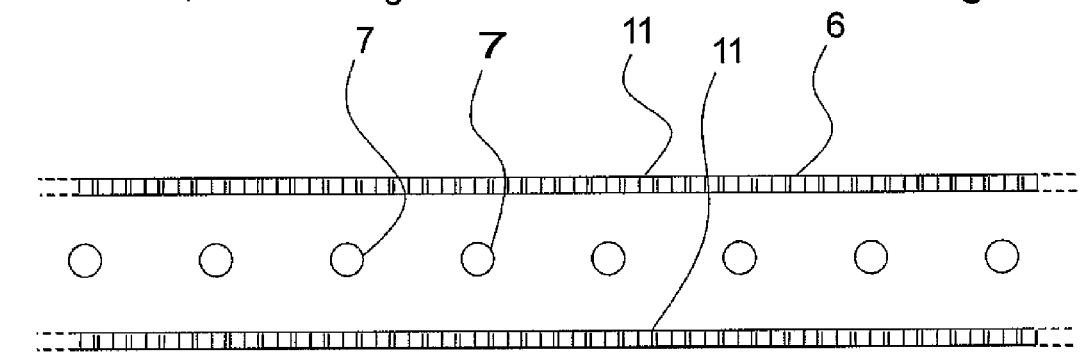
Figure 17:
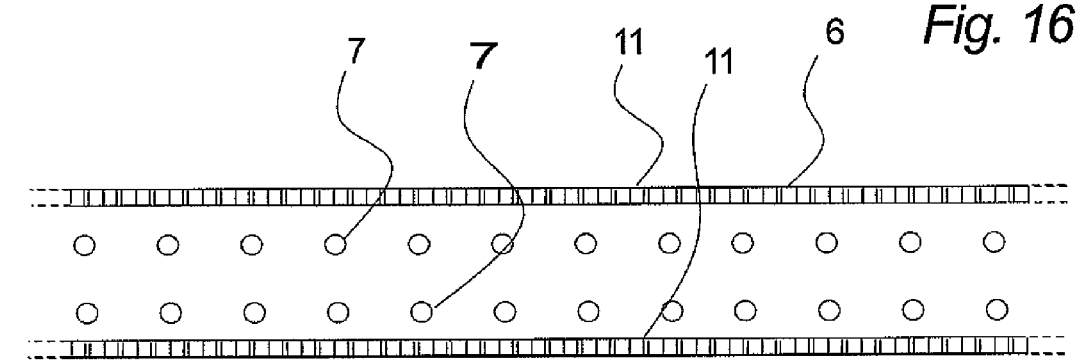

Further examples of the belt construction are shown in FIGS. 16 and 17, where a conveyor belt 6 is seen from the rear. In FIG. 16 is shown that the belt 6 can be equipped with drive elements for example at both edges of the belt, for example in the form of a toothing 11 as illustrated for cooperation with e.g. gear wheels. As previously explained, other means may be used, for example a row of holes, placed for example at each of the edges of the belt with a mutual distance corresponding to the teeth of a gear wheel.

FIG. 17 corresponds to FIG. 16, but here is shown an example of how the suction holes 7 may be arranged in two rows, e.g. with the holes at the same positions in the longitudinal direction of the belt 6. As previously explained and as shown in FIGS. 2 and 3, the holes 7 in the two (or more) rows may be placed at different locations in the longitudinal direction of the belt 6.

The invention has been exemplified above with reference to specific examples. However, it should be understood that the invention is not limited to the particular examples described above but may be used in connection with a wide variety of applications. Further, it should be understood that the device according to the invention may be designed in a multitude of varieties within the scope of the invention as specified in the claims.

The invention claimed is:

1. A device for transferring flaccid food items, comprising:
   a base part having a vacuum communication means;
   a conveyor belt having a plurality of openings formed in the conveyor belt;
   a drive means for said conveyor belt; and
   a support means adapted for supporting said conveyor belt, wherein
   said conveyor belt is arranged in a course such that the conveyor belt is supported by said support means, and wherein
   said base part comprises a first part corresponding to a vacuum transport zone and a second part corresponding to a friction transport zone, wherein
   said vacuum communication means of the base part comprises a surface vacuum communication means arranged in said first part of said base part, said surface vacuum communication means comprising at least one indentation or cavity arranged in the longitudinal direction of said conveyor belt, and wherein
   said conveyor belt comprises a vacuum communication means including passages for communicating vacuum to said plurality of openings in the conveyor belt.

2. The device according to claim 1, wherein said vacuum transport zone is arranged for extending essentially vertically.

3. The device according to claim 1, wherein said vacuum transport zone is arranged for extending in an angle in relation to the horizontal level, said angle being comprised in an interval from 45° to 90°.

4. The device according to claim 1, wherein said vacuum transport zone is arranged for extending in an angle in relation to the horizontal level, said angle being comprised in an interval from 60° to 90°.

5. The device according to claim 1, wherein said vacuum transport zone is arranged for extending in an angle in relation to the horizontal level, said angle being comprised in an interval from 75° to 90°.

6. The device according to claim 1, wherein said vacuum transport zone is arranged for extending in an angle in relation to the horizontal level, said angle being comprised in an interval from 90° to 135°.

7. The device according to claim 1, wherein said vacuum transport zone is arranged in such a manner that an item that is not properly engaged by the conveyor belt, or that is released during vacuum transport, will re-enter a feeding location for the device.

8. The device according to claim 1, wherein said at least one indentation or cavity is a groove or channel in the surface of said first part of the base part.

9. The device according to claim 1, wherein said vacuum communication means of the base part comprises a connection from said at least one indentation or cavity, via said base part, to a source of vacuum.

10. The device according to claim 1, wherein said at least one indentation or cavity is placed in a lateral position corresponding to the lateral location of one or more of said plurality of openings formed in the conveyor belt.

11. The device according to claim 1, wherein said surface vacuum communication means comprises a plurality of indentations or cavities arranged in the longitudinal direction of said conveyor belt (6), e.g.

12. The device according to claim 11, wherein said plurality of indentations or cavities are provided lying end to end.

13. The device according to claim 1, wherein said surface vacuum communication means comprises a plurality of indentations or cavities arranged in a plurality of locations in the lateral direction corresponding to the lateral locations of said plurality of openings formed in the conveyor belt.

14. The device according to claim 1, wherein said device comprises means for facilitating the removal of a suction effect between the vacuum transport zone and a subsequent friction transport zone.

15. The device according to claim 14, wherein said means for facilitating the removal of the suction effect between the vacuum transport zone and a subsequent friction transport zone involves the use of pneumatic means connected to said openings in the conveyor belt.

16. The device according to claim 1, wherein said device further comprises means for performing a cleaning of the openings.

17. The device according to claim 1, wherein said device is adjustable with respect to an inclination of the vacuum transport zone.

18. The device according to claim 1, wherein said device is tiltable.

19. The device according to claim 1, wherein said device comprises a plurality of said conveyor belts, each one of said conveyor belts comprising a plurality of said openings formed in said one conveyor belt, wherein each one of said conveyor belts is assigned to a corresponding part of said base part.

20. The device according to claim 19, wherein each one of said conveyor belts is individually adjustable with respect to one or more of and inclination, a position where items are delivered, and/or a position where items are picked-up.

21. The device according to claim 19, wherein said device further comprises a plurality of friction transport zones for each one of said conveyor belts.

22. The device according to claim 21, wherein each one of said conveyor belts is individually adjustable with respect to one or more of and inclination, a position where items are delivered, and/or a position where items are picked-up.

23. The device according to claim 21, wherein said friction transport zones are arranged differently at different angles in relation to each other.

24. The device according to claim 23, wherein said friction transport zones are adjustable.

25. The device according to claim 1, wherein said conveyor belt comprises at least one longitudinally extending element on a rear located laterally and corresponding to said at least one indentation or cavity in said first part of said base part.

26. The device according to claim 25, wherein said at least one longitudinally extending element on the rear of said conveyor belt comprises said vacuum communication means comprised in the conveyor belt for communicating vacuum to said openings.

27. The device according to claim 1, wherein said conveyor belt comprises toothing or a row of holes for cooperation with corresponding drive means.

28. The device according to claim 1, wherein said device further comprises adjustment means interacting with a drive motor or a roller for tightening said conveyor belt.

29. The device according to claim 1, wherein said passages for communicating vacuum to said plurality of openings in the conveyor belt are suction holes.

30. The device according to claim 1, wherein said passages for communicating vacuum to said plurality of openings in the conveyor belt are configured with extended length from said plurality of openings to the rear of the conveyor belt.

31. The device according to claim 1, wherein said flaccid food items are fed to the device in an unorderly form.

32. The device according to claim 31, wherein said flaccid food items are transferred from the device with a predetermined distance between the items.

33. A method of transferring flaccid food items, said method comprising the steps of:
- feeding said flaccid food items in an unorderly form to a vacuum transport conveyor, by means of which said items are dynamically elevated;
- transferring said flaccid food items from said vacuum transport conveyor to a friction transport conveyor;
- delivering said flaccid food items from said friction transport conveyor with a predetermined distance between the items to further processing, weighing/determination of weight, handling, packaging, and/or further transport, wherein
- said transport by said vacuum transport conveyor and said transport by said friction transport conveyor are performed using an endless conveyor belt arranged in a course comprising a vacuum transport zone and a friction transport zone, and wherein
- said items are engaged by openings in said endless conveyor belt when said items are being dynamically elevated at said vacuum transport zone while vacuum is communicated via vacuum communication means of a base part to said openings via passages in the conveyor belt, wherein
- said vacuum communication means of the base part comprises a surface vacuum communication means arranged in said first part of said base part, said surface vacuum communication means comprising at least one indentation or cavity arranged in the longitudinal direction of said conveyor belt.

34. The method according to claim 33, wherein said vacuum transport zone is arranged for extending essentially vertically.

35. The method according to claim 33, wherein said vacuum transport zone is arranged for extending in an angle in relation to the horizontal level, said angle being comprised in an interval from 45° to 90°.

36. The method according to claim 33, wherein said vacuum transport zone is arranged for extending in an angle in relation to the horizontal level, said angle being comprised in an interval from 60° to 90°.

37. The method according to claim 33, wherein said vacuum transport zone is arranged for extending in an angle in relation to the horizontal level, said angle being comprised in an interval from 75° to 90°.

38. The method according to claim 33, wherein said vacuum transport zone is arranged for extending in an angle in relation to the horizontal level, said angle being comprised in an interval from 80° to 90°.

39. The method according to claim 33, wherein said vacuum transport zone is arranged for extending in an angle in relation to the horizontal level, said angle being comprised in an interval from 90° to 135°.

40. A method according to claim 33, wherein when said one or more of said items is not properly engaged by the vacuum transport conveyor when being elevated or is released during said vacuum transport, said one or more of said items is positioned to re-enter a feeding location for the device.

* * * * *

UNITED STATES PATENT AND TRADEMARK OFFICE
CERTIFICATE OF CORRECTION

| | | |
|---|---|---|
| PATENT NO. | : 7,770,717 B2 | Page 1 of 1 |
| APPLICATION NO. | : 12/090021 | |
| DATED | : August 10, 2010 | |
| INVENTOR(S) | : Pedersen | |

It is certified that error appears in the above-identified patent and that said Letters Patent is hereby corrected as shown below:

In column 7, line 39, please replace "my" with the word --may--

Signed and Sealed this

Second Day of November, 2010

David J. Kappos
*Director of the United States Patent and Trademark Office*